(12) United States Patent
Luo et al.

(10) Patent No.: US 10,790,737 B2
(45) Date of Patent: Sep. 29, 2020

(54) CURRENT THRESHOLD REGULATION METHOD USED IN SWITCHING CONVERTERS

(71) Applicant: Chengdu Monolithic Power Systems Co. Ltd., Chengdu (CN)

(72) Inventors: Suhua Luo, Chengdu (CN); Qian Ouyang, Chengdu (CN); Wei Yuan, Chengdu (CN); Pengpeng Ma, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 1 day.

(21) Appl. No.: 16/380,962

(22) Filed: Apr. 10, 2019

(65) Prior Publication Data

US 2019/0334429 A1 Oct. 31, 2019

(30) Foreign Application Priority Data

Apr. 26, 2018 (CN) .......................... 2018 1 0383981

(51) Int. Cl.
*H02M 1/32* (2007.01)
*H02M 1/08* (2006.01)
*H02M 3/156* (2006.01)
*H02M 1/00* (2006.01)

(52) U.S. Cl.
CPC ............. *H02M 1/32* (2013.01); *H02M 1/08* (2013.01); *H02M 3/156* (2013.01); *H02M 2001/0048* (2013.01)

(58) Field of Classification Search
CPC .. H02M 1/08; H02M 1/32; H02M 2001/0009; H02M 2001/0048; H02M 3/156; H02M 3/157; H02M 3/158; H02M 3/1582; H02M 3/1584; H02H 7/1213
See application file for complete search history.

(56) References Cited

U.S. PATENT DOCUMENTS

| | | | |
|---|---|---|---|
| 9,837,911 B2* | 12/2017 | Balakrishnan | H02M 3/335 |
| 2015/0194826 A1* | 7/2015 | Xu | H02J 7/007 |
| | | | 320/107 |
| 2016/0043642 A1* | 2/2016 | Xu | H03K 17/063 |
| | | | 323/271 |
| 2017/0093296 A1* | 3/2017 | Chen | H02M 3/33546 |

(Continued)

FOREIGN PATENT DOCUMENTS

CN 206117500 U * 4/2017

*Primary Examiner* — Thienvu V Tran
*Assistant Examiner* — Shahzeb K Ahmad
(74) *Attorney, Agent, or Firm* — Perkins Coie LLP (57) ABSTRACT

A current threshold regulation method is used in a switching converter with a tank element and a transistor. The current threshold regulation method includes: detecting whether the input voltage is lower than an input under voltage threshold and generating an input under voltage indication signal; detecting whether the output voltage is lower than an output under voltage threshold and generating an output under voltage indication signal; generating a current threshold based on the input under voltage indication signal and output under voltage indication signal; comparing a current flowing though the tank element with the current threshold and generating a current comparison signal; and generating a control signal based on the current comparison signal to control the transistor.

17 Claims, 5 Drawing Sheets

(56) References Cited

U.S. PATENT DOCUMENTS

2017/0279344 A1* 9/2017 Lee .................. H02M 1/00
2017/0302155 A1* 10/2017 Takagaki .............. H02M 3/155
2018/0152103 A1* 5/2018 Mansri .................. H02M 3/156

* cited by examiner

Fig. 1

(PRIOR ART)

CURRENT THRESHOLD REGULATION METHOD USED IN SWITCHING CONVERTERS

CROSS-REFERENCE TO RELATED APPLICATIONS

This application claims the benefit of CN application 201810383981.0, filed on Apr. 26, 2018, and incorporated herein by reference.

TECHNICAL FIELD

The present invention generally relates to electronic circuits, and more particularly but not exclusively, to switching converters and control methods thereof.

BACKGROUND

Figure 1:
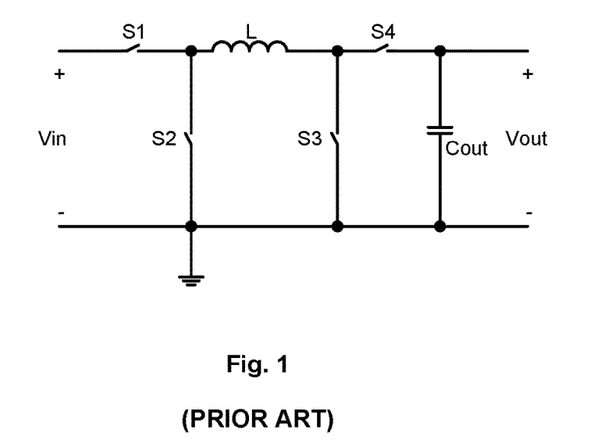
FIG. 1 illustrates a traditional 4-switch buck-boost converter.

Along with fast growth of consumer electronics, portable electronic devices are becoming smaller and lighter. Requirement of their compatibility also becomes increasingly higher. Power modules of these devices, as a result, need to be high efficient, and be compatible with power supplies having different output voltage and power capacity. Buck-boost converters, such as the traditional 4-switch buck-boost converter shown in FIG. 1, are widely used in these applications.

To protect the power supply, input current of the converter is normally limited, e.g., to be lower than a predetermined fixed threshold. However, how to set up a current threshold which is suitable for various power supplies becomes a challenge.

SUMMARY

Embodiments of the present invention are directed to a current threshold regulation method of a switching converter, wherein the switching converter includes a tank element and a transistor coupled to the tank element, and is configured to convert an input voltage into an output voltage. The current threshold regulation method comprises: detecting whether the input voltage is lower than an input under voltage threshold and generating an input under voltage indication signal; detecting whether the output voltage is lower than an output under voltage threshold and generating an output under voltage indication signal; generating a current threshold based on the input under voltage indication signal and output under voltage indication signal; comparing a current flowing though the tank element with the current threshold and generating a current comparison signal; and generating a control signal based on the current comparison signal to control the transistor.

Embodiments of the present invention are also directed to a controller used in a switching converter, wherein the switching converter includes a tank element and a transistor coupled to the tank element, and is configured to convert an input voltage into an output voltage. The controller comprises: an input under voltage detector configured to detect whether the input voltage is lower than an input under voltage threshold and generate an input under voltage indication signal; an output under voltage detector configured to detect whether the output voltage is lower than an output under voltage threshold and generate an output under voltage indication signal; a current threshold generator coupled to the input under voltage detector and output under voltage detector, wherein the current threshold generator generates a current threshold based on the input under voltage indication signal and output under voltage indication signal; a current comparing circuit coupled to the current threshold generator, wherein the current comparing circuit compares a current flowing though the tank element with the current threshold and generates a current comparison signal; and a control circuit coupled to the current comparing circuit, wherein based on the current comparison signal, the control circuit generates a control signal to control the transistor.

Embodiments of the present invention are further directed to a switching converter configured to convert an input voltage into an output voltage, comprising: a tank element; a transistor coupled to the tank element; and a controller coupled to the transistor. The controller includes: an input under voltage detector configured to detect whether the input voltage is lower than an input under voltage threshold and generate an input under voltage indication signal; an output under voltage detector configured to detect whether the output voltage is lower than an output under voltage threshold and generate an output under voltage indication signal; a current threshold generator coupled to the input under voltage detector and output under voltage detector, wherein the current threshold generator generates a current threshold based on the input under voltage indication signal and output under voltage indication signal; a current comparing circuit coupled to the current threshold generator, wherein the current comparing circuit compares a current flowing though the tank element with the current threshold and generates a current comparison signal; and a control circuit coupled to the current comparing circuit, wherein based on the current comparison signal, the control circuit generates a control signal to control the transistor.

Embodiments of the present invention are further directed to a current threshold regulation method of a switching converter, wherein the switching converter includes a tank element and a transistor coupled to the tank element, and is configured to convert an input voltage into an output signal. The current threshold regulation method comprises: detecting whether the input voltage is lower than a first threshold and generating a first indication signal; detecting whether the output signal is lower than a second threshold and generating a second indication signal; adjusting a threshold upper limit and a threshold lower limit based on the first indication signal and second indication signal; calculating a current threshold in accordance with half of a sum of the threshold upper limit and threshold lower limit; comparing a current flowing though the tank element with the current threshold; and generating a control signal based on the current comparison signal to control the transistor.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

With regard to switching converters which are compatible with various power supplies, fixed current threshold traditionally adopted in prior arts does not work. This is because, if this current threshold is too high, the power supply might be overloaded and could not operate properly. If this current threshold is too low, energy provided by the power supply might not be sufficient to stabilize the output voltage of the switching converter.

Figure 2:
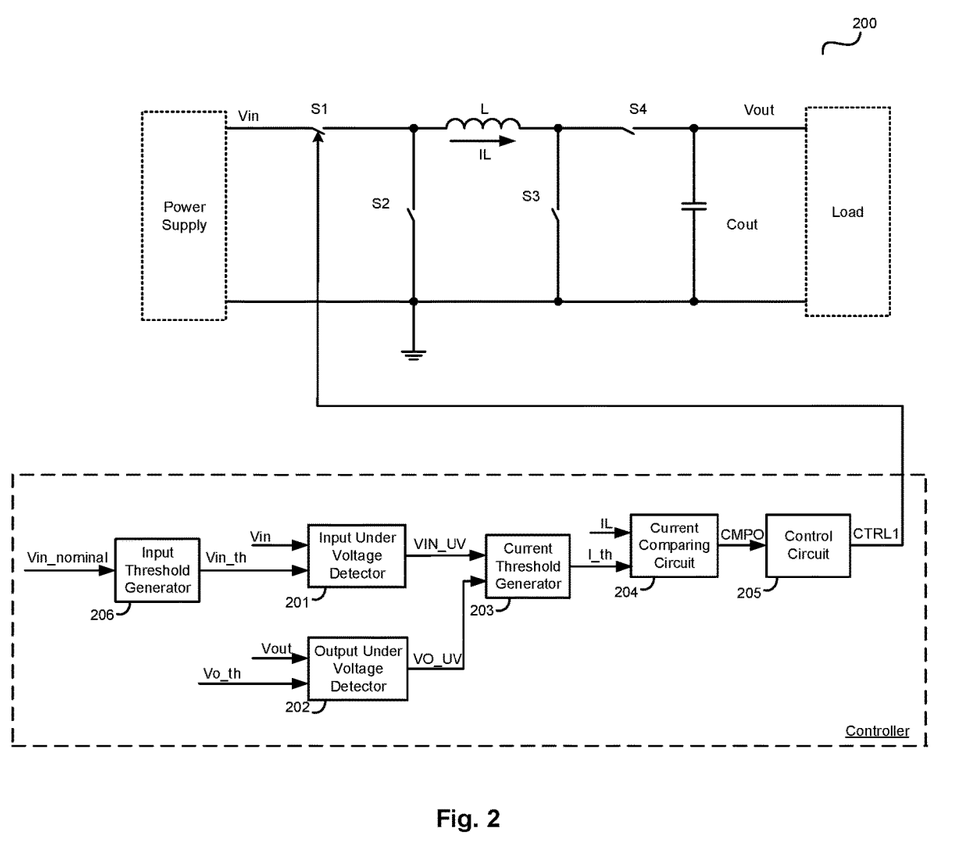
FIG. 2 is a block diagram of a buck-boost converter 200 in accordance with an embodiment of the present invention.

FIG. 2 is a block diagram of a buck-boost converter 200 in accordance with an embodiment of the present invention. The buck-boost converter 200 comprises transistors S1~S4, an inductor L, an output capacitor Cout and a controller. The transistor S1 has a first terminal, a second terminal and a control terminal, wherein the first terminal is configured to receive an input voltage Vin. The transistor S2 has a first terminal, a second terminal and a control terminal, wherein the first terminal is coupled to the second terminal of the transistor S1, the second terminal is coupled to a reference ground. The inductor L has a first terminal and a second terminal, wherein the first terminal is coupled to the second terminal of the transistor S1 and the first terminal of the transistor S2. The transistor S3 has a first terminal, a second terminal and a control terminal, wherein the first terminal is coupled to the second terminal of the inductor L, the second terminal is grounded. The transistor S4 has a first terminal, a second terminal and a control terminal, wherein the first terminal is coupled to the second terminal of the inductor L and the first terminal of the transistor S3, the second terminal is configured to provide an output voltage Vout to a load. The output capacitor Cout is coupled between the second terminal of the transistor S4 and the reference ground. The transistors S1~S4 might be any controllable semiconductor devices, such as MOSFETs, IGBTs and so on.

The controller includes an input under voltage detector 201, an output under voltage detector 202, a current threshold generator 203, a current comparing circuit 204 and a control circuit 205. The input under voltage detector 201 is configured to detect whether the input voltage Vin is lower than an input under voltage threshold Vin_th, and generate an input under voltage indication signal VIN_UV. The output under voltage detector 202 is configured to detect whether the output voltage Vout is lower than an output under voltage threshold Vo_th, and generate an output under voltage indication signal VO_UV. The current threshold generator 203 is coupled to the input under voltage detector 201 and output under voltage detector 202, wherein based on the input under voltage indication signal VIN_UV and output under voltage indication signal VO_UV, the current threshold generator 203 generates a current threshold I_th. The current comparing circuit 204 is coupled to the current threshold generator 203, wherein the current comparing circuit 204 compares a current IL flowing through the inductor with the current threshold I_th and generates a current comparison signal CMPO. The control circuit 205 is coupled to the current comparing circuit 204, wherein based on the current comparison signal CMPO, the control circuit 205 generates a control signal CTRL1 to control the transistor S1. For example, the control circuit 205 could turn off the transistor S1 when the current IL is larger than the current threshold I_th, so as to limit an input current of the converter 200.

In an embodiment, the controller further includes an input threshold generator 206, which is configured to receive a rated value Vin_nominal of the input voltage Vin and generate the input under voltage threshold Vin_th based thereupon. The rated value Vin_nominal could be achieved through sampling the input voltage Vin when the transistor S1 is off. In one embodiment, the input under voltage threshold Vin_th is proportional to the rated value Vin_nominal. For instance, Vin_th is equal to Vin_nominal*80%.

In most applications, the power supply is a constant voltage source. Its output voltage, which is the input voltage Vin of the converter 200, is generally a constant value during normal operation. The buck-boost converter 200 controls the transistors S1~S4 based on the output voltage Vout and a reference voltage Vref, so as to substantially regulate the output voltage Vout to a constant value (e.g. 5V).

If the input voltage Vin becomes lower than the input under voltage threshold Vin_th, this probably means the present power requirement of the load has exceeded the power capacity of the power supply. The current threshold generator 203 will decrease the current threshold I_th, so as to reduce the input power as well as the input current I_in of the buck-boost converter 200. If the output voltage Vout becomes lower than the output under voltage threshold Vo_th, this probably means the present input power of the buck-boost converter 200 is not sufficient to satisfy the power requirement of the load. The current threshold generator 203 will increase the current threshold I_th, so as to enlarge the input power as well as the input current I_in of the buck-boost converter 200. Since the current threshold I_th is regulated according to status of the input voltage and output voltage of the switching converter, it could provide suitable current limit protection for switching converters which are compatible with various power supplies.

Figure 3:
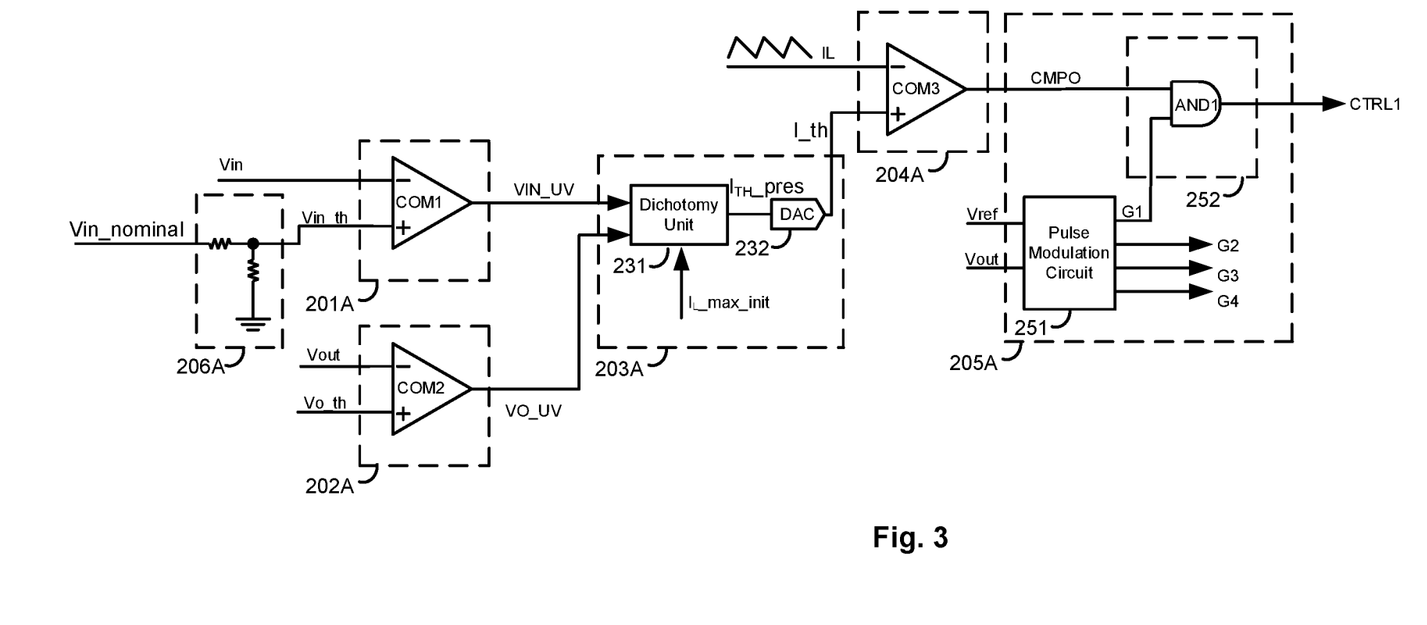
FIG. 3 schematically illustrates a controller of the buck-boost converter 200, in accordance with an embodiment of the present invention.

FIG. 3 schematically illustrates a controller of the buck-boost converter 200, in accordance with an embodiment of the present invention. In this embodiment, the input threshold generator 206A includes a resistor divider coupled between the rated value VIN_nominal and the reference ground. The input under voltage detector 201A includes a comparator COM1. The non-inverting input terminal of the comparator COM1 is coupled to the input threshold generator 206A to receive the input under voltage threshold Vin_th, the inverting input terminal is configured to receive the input voltage Vin, and the output terminal is configured to provide the input under voltage indication signal VIN_UV. The output under voltage detector 202A includes a comparator COM2. The non-inverting input terminal of the comparator COM2 is coupled to the input threshold generator 206A to receive the output under voltage threshold Vo_th, the inverting input terminal is configured to receive the output voltage Vout, and the output terminal is configured to provide the output under voltage indication signal VO_UV.

A dichotomy method is adopted by the current threshold generator 203A, which includes a dichotomy unit 231 and a digital to analog converter (DAC) 232. The dichotomy unit 231 adjusts a threshold upper limit ITH_upper and a threshold lower limit ITH_lower based on the input under voltage indication signal VIN_UV and output under voltage indication signal VO_UV, and then calculates a present value ITH_pres of the current threshold in accordance with half of a sum of the threshold upper limit ITH_upper and threshold lower limit ITH_lower. In other words, the present value ITH_pres of the current threshold could be expressed as:

$$I_{TH\_pres} = \frac{I_{TH\_upper} + I_{TH\_lower}}{2} \qquad (1)$$

The threshold upper limit ITH_upper and threshold lower limit ITH_lower are normally digital signals, and so does the present value ITH_pres. Through DAC 232, the digital present value ITH_pres is converted into the current threshold I_th, which is normally an analog signal.

In one embodiment, at the very beginning of the current threshold regulation, the threshold upper limit ITH_upper and the present value ITH_pres are both set to an initial maximum value, and the threshold lower limit ITH_lower is set to zero. Afterwards, they are adjusted based on the input under voltage indication signal VIN_UV and output under voltage indication signal VO_UV. If the input voltage Vin is lower than the input under voltage threshold Vin_th, the dichotomy unit 231 will set the threshold upper limit ITH_upper to be equal to the present value ITH_pres, maintain the threshold lower limit ITH_lower unchanged, and then produce a new present value ITH_pres according to equation (1). If the output voltage Vout is lower than the output under voltage threshold Vo_th, the dichotomy unit 231 will set the threshold lower limit ITH_lower to be equal to the present value ITH_pres, maintain the threshold upper limit ITH_upper unchanged, and then generates a new present value ITH_pres according to equation (1).

The current comparing circuit 204A includes a comparator COM3. The non-inverting input terminal of the comparator COM3 is coupled to receive the current threshold I_th, the inverting input terminal is configured to receive the inductor current IL, and the output terminal is configured to provide the current comparison signal CMPO. The control circuit 205A includes a pulse modulation circuit 251 and logic gate circuit 252. The pulse modulation circuit 251 is configured to generate pulse signals G1-G4 to respectively control the transistors S1-S4. Generally speaking, the pulse signals G1 and G2 are complementary, and pulse signals G3 and G4 are complementary, despite of the dead time influence. The logic gate circuit 252 has a first input terminal, a second input terminal and an output terminal, wherein the first input terminal is coupled to the output terminal of the current comparing circuit 204A, the second input terminal is coupled to the pulse modulation circuit 251 to receive the pulse signal G1, and the output terminal is configured to provide the control signal CTRL1 for controlling the transistor S1.

In some embodiments, the logic gate circuit 25 could include an AND gate AND1, connected as shown in FIG. 3. If the inductor current IL is higher than the current threshold I_th, the current comparison signal CMPO will be logical low. As a result, no matter what state the pulse signal G1 is in, the control signal CTRL1 output by the AND gate AND1 will be logical low to keep the transistor S1 off.

In the embodiment shown in FIG. 3, for ease of description, the input voltage Vin, output voltage Vout and inductor current IL are directly utilized for signal comparison. It is obvious to people of ordinary skills in the art that, however, in practical applications, the input voltage Vin, output voltage Vout and inductor current IL could be sensed first, e.g. through various sensing techniques. And the sensing signals indicative of the input voltage Vin, output voltage Vout and inductor current IL are then respectively compared with corresponding thresholds, to realize signal comparison. Furthermore, the inductor current IL could be sensed through sampling the current flowing through the transistor S1.

Figure 4:
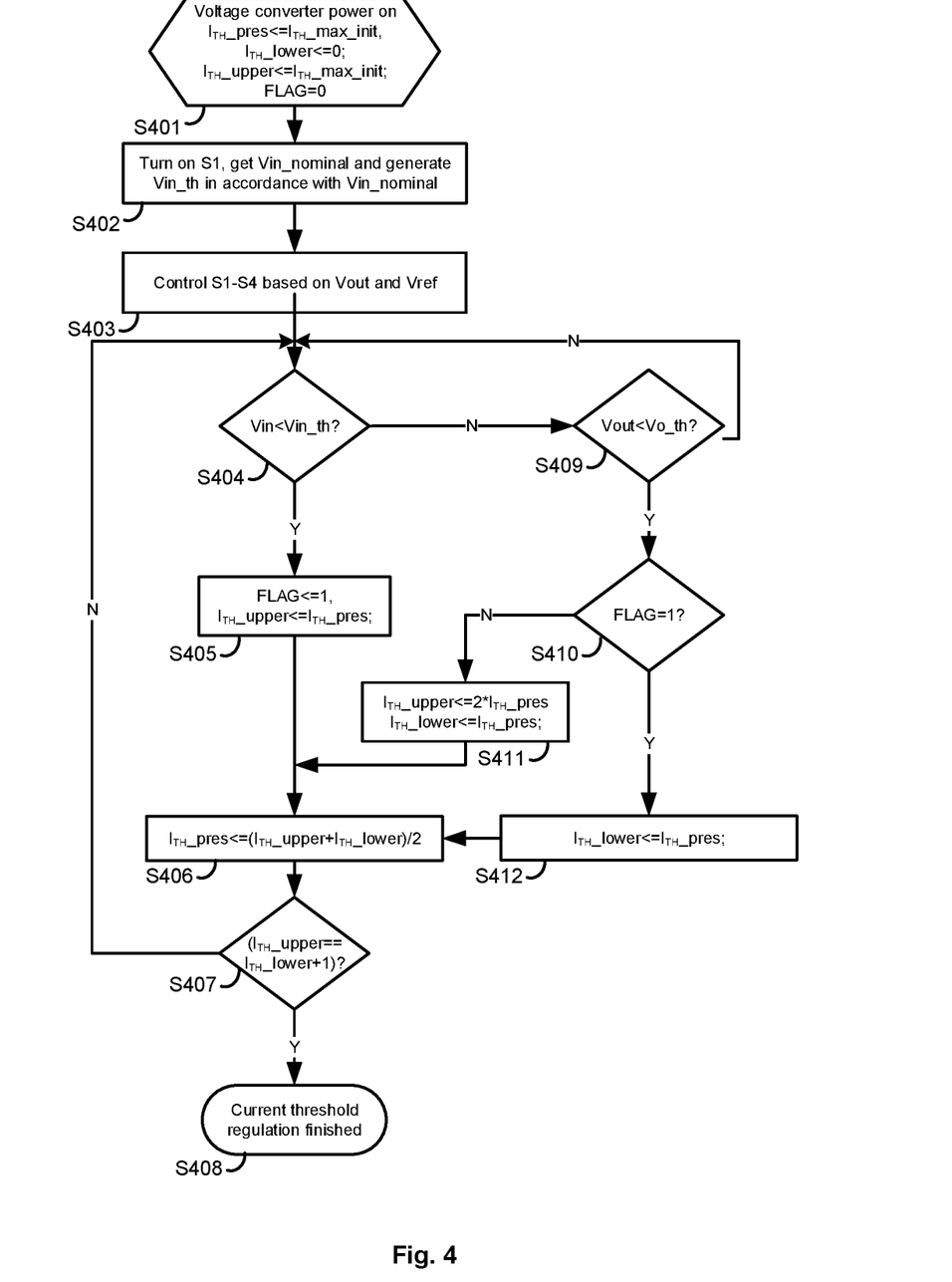
FIG. 4 is a working flowchart of the controller shown in FIG. 3, in accordance with an embodiment of the present invention.

FIG. 4 is a working flowchart of the controller shown in FIG. 3, in accordance with an embodiment of the present invention. It includes steps S401-S412.

At step S401, the switching converter powers on. The threshold upper limit ITH_upper and the present value ITH_pres are both set to an initial maximum value ITH_max_init. The threshold lower limit ITH_lower and an input under voltage flag signal FLAG are both set to zero.

At step S402, the transistor S1 is turned off, and the rated value Vin_nominal is generated through sampling the input voltage Vin of the switching converter. After that, the input under voltage threshold Vin_th is generated in accordance with the rated value Vin_nominal. In an example of the invention, the input under voltage threshold Vin_th is proportional to the rated value Vin_nominal.

At step S403, the transistors S1-S4 are controlled based on the output voltage Vout and reference voltage Vref, so as to regulate the output voltage Vout to be substantially equal to Vref. Any suitable control methods could be used here to realize the voltage regulation, for instance, fixed frequency peak current control, average current control, off time control and so on.

At step S404, the input voltage Vin and the input under voltage threshold Vin_th are compared with each other. If the input voltage Vin is lower than the input under voltage threshold Vin_th, the workflow will go to step S405. Otherwise, it will go to step S409.

At step S405, the input under voltage flag signal FLAG is set to 1, and the threshold upper limit ITH_upper is set to be equal to the present value ITH_pres. The threshold lower limit ITH_lower is kept unchanged.

At step S406, a new present value ITH_pres is calculated according to equation (1). This means, the present value ITH_pres is updated.

At step S407, whether the threshold upper limit ITH_upper is equal to a sum of the threshold lower limit ITH_lower and 1LSB (least significant bit) is monitored. If the threshold upper limit ITH_upper is equal to the sum of the threshold lower limit ITH_lower and 1LSB, the workflow will go to step S408, indicating that the current threshold regulation has been finished. Otherwise, the workflow will back to step S404 to continue adjusting the current threshold.

At step S409, the output voltage Vout is compared with the output under voltage threshold Vo_th. If the output voltage Vout is lower than Vo_th, the workflow will go to step S410. Otherwise, it will back to S404.

At step S410, whether the input under voltage flag signal FLAG is 1 is determined. If yes, which means the input voltage Vin has been lower than Vin_th, the workflow will go to step S412. Otherwise, it will go to step S411.

At step S411, the threshold lower limit ITH_lower is set to be equal to the present value ITH_pres, and the threshold upper limit ITH_upper is set to be equal to twice of the present value ITH_pres. Afterwards, the step S406 is processed to update the present value ITH_pres in accordance with equation (1).

At step S412, the threshold lower limit ITH_lower is set to be equal to the present value ITH_pres, and the threshold upper limit ITH_upper is kept unchanged. Then the step S406 is processed to update the present value ITH_pres in accordance with equation (1).

The embodiment shown in FIG. 3 utilizes a peak current limit scheme, which turns off the transistor S1 when the inductor current IL becomes higher than the current threshold I_th. However, people of ordinary skills in the art could understand that, this is not intended to limit the scope of the invention. The present invention is also applicable with valley current limit scheme, wherein the control circuit could change the transistor S1 from off state to on state based on the output voltage Vout and reference voltage Vref only when the inductor current IL is lower than the current threshold I_th.

Figure 5:
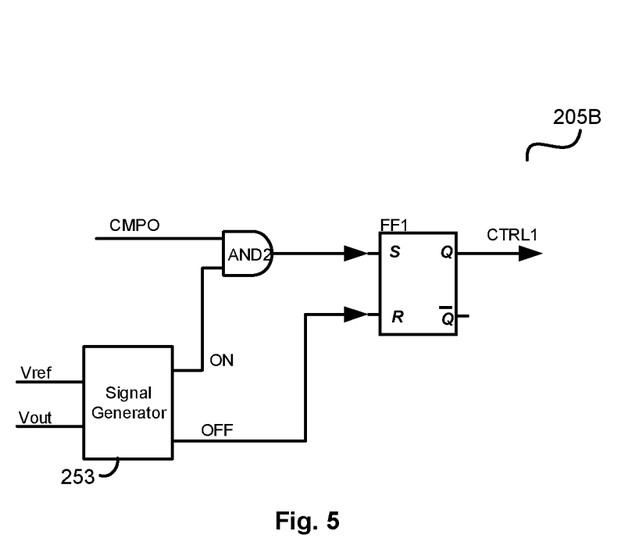
FIG. 5 schematically illustrates a control circuit 205B in accordance with an embodiment of the present invention.

FIG. 5 schematically illustrates a control circuit 205B in accordance with an embodiment of the present invention. It comprises a signal generator 253, an AND gate AND2 and a RS flip-slop FF1. The signal generator 253 is configured to generate signals ON and OFF. The two input terminals of the AND gate AND2 are respectively coupled to the current comparison signal CMPO and signal ON. The set terminal S of the flip-flip FF1 is coupled to the output terminal of the AND gate AND2, the reset terminal R is coupled to the signal generator 251 to receive the signal OFF, the output terminal Q is configured to provide the control signal CTRL1 for controlling the transistor S1.

The signal generator 253 could generate the signal ON and OFF based on constant on-time control method or other suitable control methods. Regarding the control circuit 205B shown in FIG. 5, only when the inductor current IL is lower than the current threshold I_th could the signal ON trigger the control signal CTRL1 into logical high to turn on the transistor S1. Otherwise if the inductor current IL is higher than I_th, the current comparison signal CMPO and the output signal of the AND gate AND2 will both be logical low. Thus the control signal CTRL1 will not be triggered by the signal ON.

Figure 6:
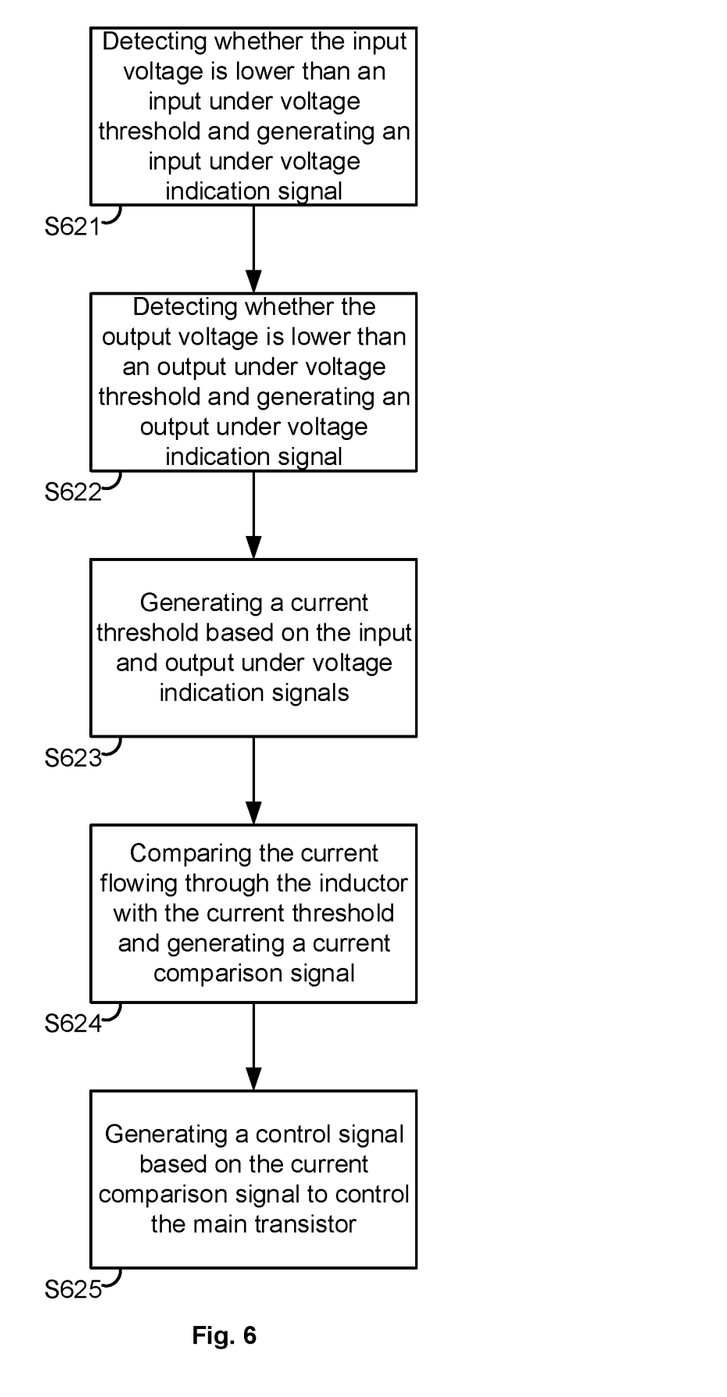
FIG. 6 is a flowchart of a control method used in switching converters, in accordance with an embodiment of the present invention.

FIG. 6 is a flowchart of a control method used in switching converters, in accordance with an embodiment of the present invention. It includes steps S621-S625.

At step S621, whether the input voltage Vin is lower than an input under voltage threshold Vin_th is detected, and an input under voltage indication signal VIN_UV is generated.

At step S622, whether the output voltage Vout is lower than an output under voltage threshold Vo_th is detected, and an output under voltage indication signal VO_UV is generated.

At step S623, a current threshold I_th is generated based on the input under voltage indication signal VIN_UV and output under voltage indication signal VO_UV.

In an embodiment, step S623 includes: decreasing the current threshold I_th if the input voltage Vin is lower than the input under voltage threshold VIN_UV; and increasing the current threshold I_th if the output voltage Vo is lower than the output under voltage threshold VO_UV. A dichotomy method might be used in step S623, which incorporates: adjusting a threshold upper limit ITH_upper and a threshold lower limit ITH_lower based on the indication signals VIN_UV and VOUT_UV, and calculating the current threshold I_th in accordance with half of a sum of the threshold upper limit ITH_upper and threshold lower limit ITH_lower.

At step S624, an inductor current IL is compared with the current threshold I_th to generate a current comparison signal CMPO.

At step S625, a control signal CTRL1 is generated based on the current comparison signal CMPO to control the transistor S1. Step S625 might include either one of: maintaining the transistor S1 off when the inductor current IL is higher than the current threshold I_th; and turning on the transistor S1 based on the output voltage Vout and a reference voltage Vref only when the inductor current IL is lower than the current threshold I_th.

In the embodiments described above, a 4-switch buck-boost converter is used as an example to illustrate the current threshold regulation scheme of the present invention. Nevertheless, it should be noted that this is not intended to limit the scope of the invention. The present invention is also applicable to converters with other topologies, such as boost, buck, flyback and so on. These converters all have a tank element (e.g. inductor or transformer) and a transistor coupled to the tank element. Energy from the power supply is stored in the tank element when the transistor is on, and then provided to the load when the transistor is off.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A current threshold regulation method of a switching converter, wherein the switching converter includes a tank element and a transistor coupled to the tank element, and is configured to convert an input voltage into an output voltage, the current threshold regulation method comprises:
   comparing the input voltage with an input under voltage threshold and generating an input under voltage indication signal indicative of whether the input voltage is lower than the input under voltage threshold;
   comparing the output voltage with an output under voltage threshold and generating an output under voltage indication signal indicative of whether the output voltage is lower than the output under voltage threshold;
   generating a current threshold based on the input under voltage indication signal and output under voltage indication signal;
   comparing a current flowing though the tank element with the current threshold and generating a current comparison signal; and
   generating a control signal based on the current comparison signal to control the transistor;
   wherein the step of generating the current threshold includes:

decreasing the current threshold if the input voltage is lower than the input under voltage threshold; and increasing the current threshold if the output voltage is lower than the output under voltage threshold.

2. The current threshold regulation method of claim 1, wherein the step of generating the current threshold includes:

adjusting a threshold upper limit and a threshold lower limit based on the input under voltage indication signal and output under voltage indication signal; and calculating the current threshold in accordance with half of a sum of the threshold upper limit and threshold lower limit.

3. The current threshold regulation method of claim 2, wherein the step of adjusting the threshold upper limit and threshold lower limit includes:

setting the threshold upper limit to be equal to a present value of the current threshold and maintaining the threshold lower limit unchanged, if the input voltage is lower than the input under voltage threshold; and setting the threshold lower limit to be equal to the present value of the current threshold and maintaining the threshold upper limit unchanged, if the output voltage is lower than the output under voltage threshold.

4. The current threshold regulation method of claim 2, wherein the step of adjusting the threshold upper limit and threshold lower limit includes:

setting the threshold upper limit to be equal to a present value of the current threshold and maintaining the threshold lower limit unchanged, if the input voltage is lower than the input under voltage threshold;

setting the threshold lower limit to be equal to the present value of the current threshold and setting the threshold upper limit to be equal to twice of the present value of the current threshold, if the output voltage is lower than the output under voltage threshold and the input voltage has not been lower than the input under voltage threshold; and setting the threshold lower limit to be equal to the present value of the current threshold and maintaining the threshold upper limit unchanged, if the output voltage is lower than the output under voltage threshold and the input voltage has been lower than the input under voltage threshold.

5. The current threshold regulation method of claim 1, wherein the step of generating the control signal includes either one of:

maintaining the transistor off when the current flowing through the tank element is higher than the current threshold; and turning on the transistor based on the output voltage and a reference voltage only when the current flowing through the tank element is lower than the current threshold.

6. A controller used in a switching converter, wherein the switching converter includes a tank element and a transistor coupled to the tank element, and is configured to convert an input voltage into an output voltage, the controller comprises:

an input under voltage detector configured to compare the input voltage with an input under voltage threshold and generate an input under voltage indication signal indicative of whether the input voltage is lower than the input under voltage threshold;

an output under voltage detector configured to compare the output voltage with an output under voltage threshold and generate an output under voltage indication signal indicative of whether the output voltage is lower than the output under voltage threshold;

a current threshold generator coupled to the input under voltage detector and output under voltage detector, wherein the current threshold generator generates a current threshold based on the input under voltage indication signal and output under voltage indication signal;

a current comparing circuit coupled to the current threshold generator, wherein the current comparing circuit compares a current flowing though the tank element with the current threshold and generates a current comparison signal; and a control circuit coupled to the current comparing circuit, wherein based on the current comparison signal, the control circuit generates a control signal to control the transistor;

wherein the current threshold generator decreases the current threshold if the input voltage is lower than the input under voltage threshold, and increases the current threshold if the output voltage is lower than the output under voltage threshold.

7. The controller of claim 6, wherein the current threshold generator adjusts a threshold upper limit and a threshold lower limit based on the input under voltage indication signal and output under voltage indication signal, and calculates the current threshold in accordance with half of a sum of the threshold upper limit and threshold lower limit.

8. The controller of claim 7, wherein:

if the input voltage is lower than the input under voltage threshold, the threshold upper limit will be set to be equal to a present value of the current threshold, and the threshold lower limit will be maintained unchanged; and if the output voltage is lower than the output under voltage threshold, the threshold lower limit will be set to be equal to the present value of the current threshold, and the threshold upper limit will be maintained unchanged.

9. The controller of claim 7, wherein:

if the input voltage is lower than the input under voltage threshold, the threshold upper limit will be set to be equal to a present value of the current threshold, and the threshold lower limit will be maintained unchanged;

if the output voltage is lower than the output under voltage threshold and the input voltage has not been lower than the input under voltage threshold, the threshold lower limit will be set to be equal to the present value of the current threshold, and the threshold upper limit will be set to be equal to twice of the present value of the current threshold; and if the output voltage is lower than the output under voltage threshold and the input voltage has been lower than the input under voltage threshold, the threshold lower limit will be set to be equal to the present value of the current threshold, and the threshold upper limit will be maintained unchanged.

10. The controller of claim 6, wherein if the current flowing through the tank element is higher than the current threshold, the control circuit will maintain the transistor off.

11. The controller of claim 6, wherein the control circuit could turn on the transistor based on the output voltage and a reference voltage only when the current flowing through the tank element is lower than the current threshold.

12. The controller of claim 6, further comprising:
an input threshold generator configured to receive a rated value of the input voltage and generate the input under voltage threshold based on the rated value.

13. A switching converter configured to convert an input voltage into an output voltage, comprising:
a tank element;
a transistor coupled to the tank element; and
a controller coupled to the transistor, including:
an input under voltage detector configured to compare the input voltage with an input under voltage threshold and generate an input under voltage indication signal indicative of whether the input voltage is lower than the input under voltage threshold;
an output under voltage detector configured to compare the output voltage with an output under voltage threshold and generate an output under voltage indication signal indicative of whether the output voltage is lower than the output under voltage threshold;
a current threshold generator coupled to the input under voltage detector and output under voltage detector, wherein the current threshold generator generates a current threshold based on the input under voltage indication signal and output under voltage indication signal;
a current comparing circuit coupled to the current threshold generator, wherein the current comparing circuit compares a current flowing though the tank element with the current threshold and generates a current comparison signal; and
a control circuit coupled to the current comparing circuit, wherein based on the current comparison signal, the control circuit generates a control signal to control the transistor;
wherein the current threshold generator decreases the current threshold if the input voltage is lower than the input under voltage threshold, and increases the current threshold if the output voltage is lower than the output under voltage threshold.

14. The switching converter of claim 13, wherein the current threshold generator adjusts a threshold upper limit and a threshold lower limit based on the input under voltage indication signal and output under voltage indication signal, and calculates the current threshold in accordance with half of a sum of the threshold upper limit and threshold lower limit.

15. The switching converter of claim 14, wherein:
if the input voltage is lower than the input under voltage threshold, the threshold upper limit will be set to be equal to a present value of the current threshold, and the threshold lower limit will be maintained unchanged; and
if the output voltage is lower than the output under voltage threshold, the threshold lower limit will be set to be equal to the present value of the current threshold, and the threshold upper limit will be maintained unchanged.

16. The switching converter of claim 14, wherein:
if the input voltage is lower than the input under voltage threshold, the threshold upper limit will be set to be equal to a present value of the current threshold, and the threshold lower limit will be maintained unchanged;
if the output voltage is lower than the output under voltage threshold and the input voltage has not been lower than the input under voltage threshold, the threshold lower limit will be set to be equal to the present value of the current threshold, and the threshold upper limit will be set to be equal to twice of the present value of the current threshold; and
if the output voltage is lower than the output under voltage threshold and the input voltage has been lower than the input under voltage threshold, the threshold lower limit will be set to be equal to the present value of the current threshold, and the threshold upper limit will be maintained unchanged.

17. A current threshold regulation method of a switching converter, wherein the switching converter includes a tank element and a transistor coupled to the tank element, and is configured to convert an input voltage into an output signal, the current threshold regulation method comprises:
detecting whether the input voltage is lower than a first threshold and generating a first indication signal;
detecting whether the output signal is lower than a second threshold and generating a second indication signal;
adjusting a threshold upper limit and a threshold lower limit based on the first indication signal and second indication signal;
calculating a current threshold in accordance with half of a sum of the threshold upper limit and threshold lower limit;
comparing a current flowing though the tank element with the current threshold; and
generating a control signal based on the current comparison signal to control the transistor.

* * * * *